Figure 3:
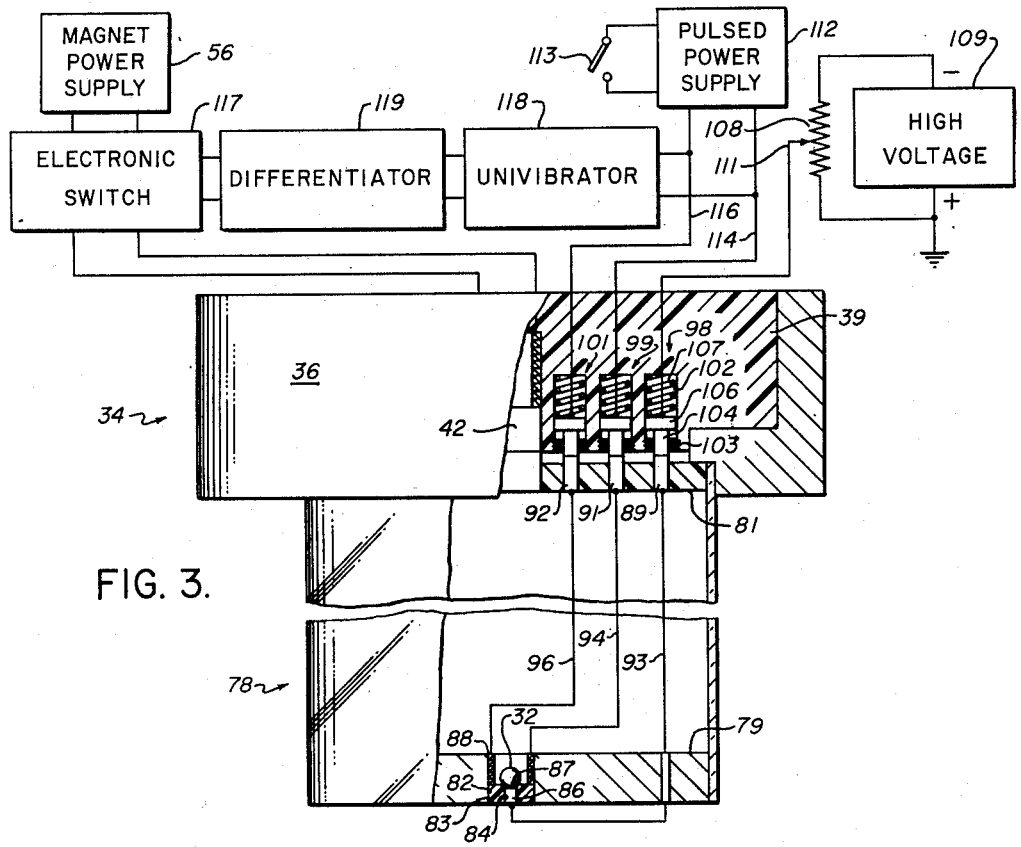

Aug. 4, 1959 Q. A. KERNS 2,897,605
METHOD AND APPARATUS FOR DETERMINING CHARGED PARTICLE MOTION
Filed April 10, 1958 2 Sheets-Sheet 1

INVENTOR.
QUENTIN A. KERNS
BY
ATTORNEY.

Aug. 4, 1959  Q. A. KERNS  2,897,605
METHOD AND APPARATUS FOR DETERMINING CHARGED PARTICLE MOTION
Filed April 10, 1958  2 Sheets-Sheet 2
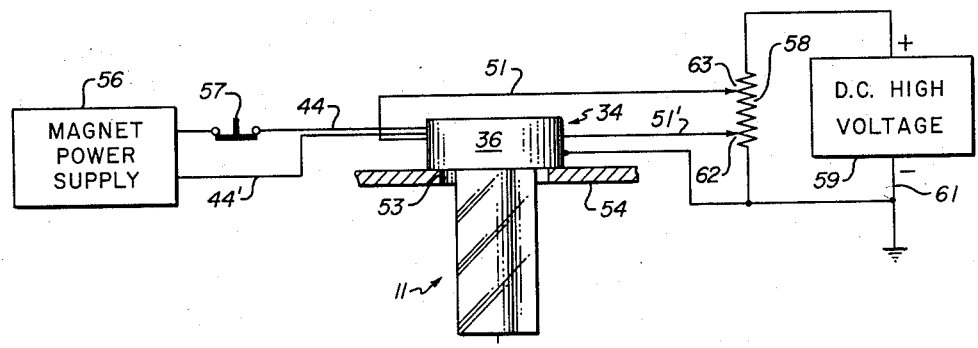
FIG. 2.
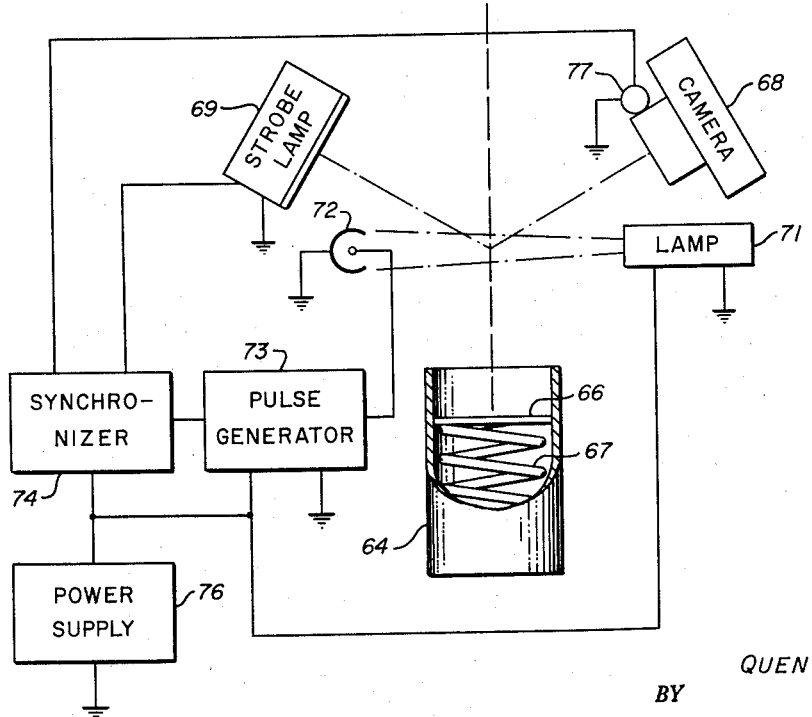
INVENTOR.
QUENTIN A. KERNS
BY
ATTORNEY.

United States Patent Office 2,897,605
Patented Aug. 4, 1959

2,897,605

METHOD AND APPARATUS FOR DETERMINING CHARGED PARTICLE MOTION

Quentin A. Kerns, Orinda, Calif., assignor to the United States of America as represented by the United States Atomic Energy Commission Application April 10, 1958, Serial No. 727,751

12 Claims. (Cl. 35—19)

The present invention relates to computation by analog means and, more particularly, to a method and apparatus for determining and displaying the motion of charged particles, such as electrons, through electric fields.

The solution of problems relating to the motion of electric charges in electrical fields is, in many instances, a laborious and complicated procedure. In some cases solutions can only practically be arrived at by making use of large digital computers. Such computers are, however, extremely expensive in terms of initial cost, maintenance, and operating charges. To provide a simpler, less costly means for the solution of such problems, various analog mechanisms have been developed. Most such mechanisms utilize small spheres which are caused to roll upon an appropriately curved surface to simulate the motion of electrons in an analogously curved electric field. Such mechanisms are, however, limited to two dimensional electron optical problems, whereas major interest centers on studying the motion of charged particles in three dimensional space.

The need for a simple inexpensive means for solving three dimensional electron optics problems has been intensified by recent advances in fast pulse circuitry. In high speed pulse work, such factors as photoelectron transit time spread in large area photomultiplier tubes become of critical importance.

The present invention utilizes a physical simulation of the structure in which particle motion is to be determined, for example a model of the photocathode and dynode system of a photomultipler tube. Electrons are simulated by small conducting spheres which rest initially on the particular surface of the model which simulates the photocathode. Potentials are applied to the electrodes of the model which potentials are made proportional to the operating potentials of the tube to be studied. Thus, were it not for the weight of the spheres, the spheres would be electrostatically accelerated through the model in a manner analogous to the motion of electrons through the tube, which motion could be recorded photographically to give the desired data.

In order to overcome gravitational influence on the spheres, the tube model is suspended and dropped. As long as the model is dropping at a rate equivalent to a free fall, the spheres are effectively weightless and simulate, in every respect, the motion of electrons. To record the desired data, the model is photographed in the course of falling.

It is thus an object of this invention to provide a method and apparatus for determining the motion of electrically charged particles in an electric field.

It is an object of this invention to provide analog means simulating the motion of charged particles in any selected electric field configuration.

It is a further object of this invention to provide a method and apparatus with which the trajectories and transit times of charged particles through any electric field may be determined and displayed.

Still another object of this invention is to provide a method and apparatus for the solution of electron optics problems which method and apparatus have particular applicaiton to three dimensional problems.

It is an object of this invention to provide means simulating an electric field and means simulating an electrically charged particle in said field together with further means simulating a condition wherein said electrically charged particles enter said field with an initial velocity.

Figure 1:
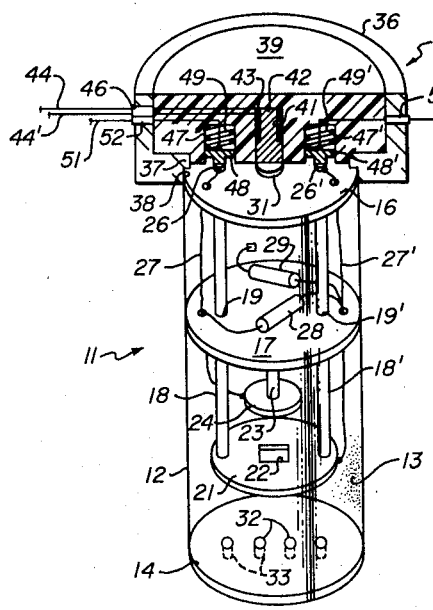

The invention, both as to its organization and method of operation, together with further objects and advantages thereof, will best be understood by reference to the following specification taken in conjunction with the accompanying drawing, in which:

Figure 1 is a perspective view, partially in section, of a typical electric field model as employed in practicing the invention;

Figure 2 is a partially schematic view showing the model in position to be dropped and showing means for suspending and electrically charging the model as well as means for photographically recording the desired data; and Figure 3 is a sectional view of a modification of a portion of the apparatus shown in Figure 1 together with further means for more closely simulating the action of charged particles in an electric field and for simulating a condition where charged particles enter an electric field with an appreciable initial velocity.

Referring now to the drawing and more particularly to Figure 1 thereof, there is shown a model 11 of a vacuum tube in which electron motion is to be determined, the model in this instance being of a portion of a photomultiplier tube. It will be understood that the choice of a photomultiplier tube model for purposes of illustrating the invention is arbitrary and that the method is applicable to any electric field structure in which particle motion is to be studied.

The model 11 includes a hollow transparent cylinder 12 having, on the inner surface, a thin coating 13 of conducting material. The cylinder 12 can, for example, be formed of Celluloid having a coating of graphite provided that the graphite coating is sufficiently thin that the interior of the cylinder remains visible through the wall thereof. The lower end of cylinder 12 is closed by a circular conducting plate 14 simulating the photocathode of the photomultiplier tube. The uppermost end of the cylinder 12 is closed by a dielectric top plate 16. A circular electrode support plate 17, formed of dielectric material, is coaxially positioned within cylinder 12 a substantial distance downward from top plate 14.

Two electrode support rods 18 and 18', formed of insulating material, are disposed longitudinally within cylinder 12, one on either side of the axis thereof. The upper ends of rods 18 and 18' are secured to top plate 16, the rods extending downwardly through suitably spaced apertures 19 and 19' in electrode support plate 17 and being terminated in the region between the electrode support plate and photocathode plate 14. A circular conducting disc 21, of lesser diameter than cylinder 12, is secured to the lower extremities of rods 18 and 18', the disc being coaxial with the cylinder. The disc 21, which is to simulate the focussing electrode of a particular photomultiplier tube, has a central rectangular opening 22 analogous to the electron passage in the corresponding phototube. To simulate the first dynode of the photomultiplier tube, a dielectric post 23 projects a short distance downward from the center of electrode support plate 17, a small conducting dynode disc 24 being coaxially mounted on the lower end of the post.

To transmit required potentials to the above-described elements for the purpose of simulating the electric field which is to be studied, two contacts 26 and 26' are embedded in the upper surface of top plate 16, one on either side of the center thereof. A first electrical lead wire 27 connects contact 26 with dynode disc 24 and a second similar lead 27' connects contact 26' with focussing electrode disc 21. Inasmuch as the potentials which are impressed on the various members of the model should ordinarily be sustained as close to the original values as is possible during the time the model is falling free from connection with the potential source, large capacitors are provided to maintain the desired charge for a short interval. A first such capacitor 28 is connected between leads 27 and 27' and a second such capacitor 29 is connected between lead 27' and the conducting coating 13 of cylinder 12, the two capacitors being fastened to the upper surface of electrode support plate 17. The capacitors 28 and 29 will, for a short interval, compensate for leakage currents between the various elements of the model.

To provide means for suspending the model 11, an insert 31 is embedded in the center of the upper surface of top plate 16 which insert is formed of magnetic material, such as iron, in order that the assembly may be held by an electromagnet, the structure of which will be hereinafter described.

To simulate charged particles, in this instance to simulate photoelectrons, a plurality of small conducting spheres 32 are placed on the upper surface of photocathode plate 14, such spheres resting on very fine apertures 33 in the plate which apertures serve to restrain the spheres from rolling out of the proper position. The spheres 32 are disposed at positions on the photocathode plate 14 from which electron motion is to be traced.

Considering now apparatus for suspending the model, for transmitting electrical charge to the elements thereof, and for releasing the model at a desired time, there is shown a stationary head member 34 to which the model attaches. Head member 34 comprises a hollow cylindrical conducting casing 36 of slightly larger diameter than the model 11, the lower end of the casing being provided with an inwardly directed annular shelf 37 which shelf defines a stepped bore 38 into the lower portion of which the upper end of model 11 may be fitted. The interior of casing 36, including the upper portion of bore 38, is filled by a dielectric cylinder 39 which cylinder is provided with an axial bore 41 opening at the undersurface of the cylinder. To hold the model 11 to head member 34, an electromagnet core 42, having a coaxial winding 43, is disposed within axial bore 41, the leads 44 and 44' of the winding being brought out radially through dielectric cylinder 39 and through bushings 46 transpierced through the wall of casing 36.

Dielectric cylinder 39 is provided with two additional bores 47 and 47' which open on the undersurface of the cylinder and which are spaced one on either side of axial bore 41 at positions corresponding to those of contacts 26 and 26' on the upper surface of the model 11. Cylindrical contacts 48 and 48' are slidingly disposed in bores 47 and 47' as are compression springs 49 and 49' which springs urge the contacts downward against contacts 26 and 26' on the top of the model 11. A high voltage lead wire 51 is transpierced through the wall of cylinder 36 by means of a bushing 52 and connects with contact 48. A second similar lead wire 51' transpierces cylinder 36 through a second bushing 52' and connects with contact 48'.

Referring now to Figure 2, the model 11 is shown suspended from head member 34 and associated equipment is shown for supplying electrical potential to the model, for initiating the drop of the model, and for photographing the model as it falls. The head member 34 is disposed in an elevated position, in this instance being centered over a circular opening 53 in a horizontal shelf 54. The tube model 11 is depended from the underside of the head member 34 by the electromagnet means previously described. Current for the electromagnet is supplied by a power supply 56 connecting with leads 44 and 44' through a normally closed push button switch 57, thus depression of the switch will cause the model 11 to fall from head member 34.

Considering now means for applying potential to the electrodes within model 11, there is shown a potentiometer 58 connected across the terminals of a high voltage source 59. The negative terminal 61 of source 59 connects with casing 36 of head member 34 and with ground. A first tap 62 of the potentiometer 58 connects with high voltage lead 51' and a second more positive tap 63 connects with lead 51.

To cushion the fall of the model 11, a cylindrical container 64 is disposed directly beneath head member 34 a distance, in this instance, of four feet. To receive the falling model, a platform 66 is disposed transversely within container 64 on the upper end of a compression spring 67.

Means for observing and recording the movement of spheres 32 through the model 11 during the fall thereof include a camera 68 focussed on a region traversed by the model, such camera being preferably aligned obliquely with respect to the direction of fall in order that a stroboscopic light 69 may be disposed opposite the camera, and aligned to illuminate the area on which the camera is focussed, without passing light directly into the camera. To trigger the camera 68 and strobe light 69 as the model 11 reaches the region on which the camera is focussed, a directional lamp 71 is disposed beneath the camera and positioned to direct a beam of light across the fall path of the model. A photoelectric cell 72 is disposed opposite lamp 71 and positioned to receive the light beam therefrom. Photoelectric cell 72 connects with a pulse generator 73 of the class producing a signal when the output of the cell is interrupted, such interruption resulting from the passage of model 11 between the lamp 71 and cell 72. Pulse generator 73 connects with a synchronizer 74 which, upon receipt of a pulse, couples power from a supply 76 to strobe lamp 69 and simultaneously actuates to shutter control 77 of camera 68.

It will be understood that the foregoing is but one mode of recording the desired data. The apparatus can for example be disposed in a light tight enclosure in which case the camera shutter is left open thus eliminating the need for synchronization between the camera and strobe light. Alternately, the fall of the model can be photographed by a series of cameras disposed in a vertical column giving a set of photographs displaying the progressive movement of the spheres through the model.

Considering now the sequence of steps in the solution of a particular problem, with reference to Figures 1 and 2, it is first necessary to form the lower portion of the model 11 into a replica of the electric field structure which is to be studied, for example by forming the photomultiplier tube model as hereinbefore described. The spheres 32 are then placed at the desired points on the element 14 which simulates a photoemissive surface. The model 11 is then suspended from head member 34 by insertion of the upper end of the model in bore 38, the apparatus being retained by the attraction of inserts 31 to electromagnet 42. While the model remains attached to the head member 34, the electrodes 21, and 24 are charged, to potentials determined by the setting of taps 62 and 63 on potentiometer 58, through the leads and contacts connecting with high voltage source 59. Concurrently the capacitors 28 and 29 are charged so that after the model is released, the charge upon the electrodes will be maintained for an interval of time.

The model 11 is then released from head member 34, and dropped to container 64, by depression of magnet current switch 57. As the model falls, the spheres 32 are freed from gravitational influence and are impelled through the model electrode system by electrostatic attraction analogous to the movement of electrons through a photomultiplier tube. As the falling model intercepts the light beam from lamp 71, strobe light 69 and camera 68 are triggered causing the camera to record an image of the instantaneous position of the spheres in the model which image is indicative of the position of electrons in the corresponding photomultiplier tube.

The above-described procedure gives the position of the spheres for only one instant in their passage through the structure. The entire movement of the spheres is determined by making a series of photographs with the camera being moved progressively upward or alternately by dropping the model from progressively greater heights.

Alternate techniques for obtaining the complete motion of the spheres are possible. Such motion may be followed by a movie camera, for example, to give the complete motion of the spheres during a single dropping of the model. The camera can be dropped simultaneously with the tube model in order to keep the model in the center of the field of view or the camera can be located some distance away and swivelled by suitable servo mechanisms.

To determine the potentials which are to be applied to the electrodes 21 and 24, thus determining the setting of potentiometer 58, it is first necessary to calculate what acceleration the electric field must impart to the spheres 32. The foregoing is determined, in fractions of gravitational acceleration, by dividing the distance the spheres must travel through the model by the distance the model is to drop. For example if the spacing between photocathode plate 14 and dynode element 24 is ten centimeters, and the model is to drop one hundred and twenty centimeters, the electric field must accelerate the speres 32 with a force equal to $10/120$, or $1/12$ g. which equals 0.8 meter/sec.$^2$.

Given ($a$) the required acceleration in meters/sec.$^2$, the necessary field ($E_n$) in volts/meter is determined from the following relationship:

$$a = 3/2 \frac{k_0}{\rho} \frac{E_n^2}{r}$$

where:

$k_0$=permittivity of free space ($8.85 \times 10^{-12}$ farads/meter)
$\rho$=density of sphere in kg./meter$^3$
$r$=radius of sphere in meters The foregoing relationship is obtained as follows: The sphere 32 receives a charge ($q_s$) closely approximated by the product of the charge per unit area of the plate 14 ($q_p$) and one half the surface area of sphere. Thus:

(1) $\qquad q_s = q_p(2\pi r^2)$

The unit charge ($q_p$) on the plate 14 is the product of the applied field and the permittivity of space, or (2) $\qquad q_p = E_n(k_0)$ The force (F) on the sphere 32 is the sphere charge multiplied by the applied field, thus $$F = q_s(E_n)$$

or, substituting (1) and (2) above, (3) $\qquad F = 2\pi r^2 E_n^2 k_0$

The mass, (M) of the sphere 32 may be represented as volume times density, or (4) $\qquad M = (4/3 \pi r^3)\rho$ Expressing Newton's Second Law of Motion as $$a = \frac{F}{M}$$

and substituting (3) and (4) therein gives the specified relationship:

$$a = \frac{3}{2} \frac{k_0}{\rho} \frac{E_n^2}{r}$$

The value 3/2 in the above relationship applies where the spheres rest in small apertures in the photocathode as herein described. For other geometries, a new constant must be determined.

Given the required field in volts/meter, the potential which must be applied to each electrode 21 and 24 is determined by multiplying the field value by the spacing between the electrode and the ground or photocathode plate 14.

While the above-described system gives results sufficiently precise for most purposes, it will be observed that a slight error may be present in that the charge upon the spheres is dependent upon the field $E_n$ whereas in a real system the charge upon an electron is fixed. In addition it may be necessary to simulate a condition in which electrons enter the electric field with a significant initial velocity.

Referring now to Figure 3, there is shown a modification of the previously described apparatus by which means the spheres may be charged to a desired value independently of the applied electric field and by which means the spheres may be impelled into the field with any desired initial velocity. Such modification comprises a tube model 78 which is generally similar to the tube model previously described with the exception of a modified photocathode plate 79 at the lower extremity and a modified top plate 81 at the upper end.

Considering now the photocathode plate 79 it will be observed that such plate is made substantially thicker in comparison with the previous embodiment and is provided with a vertical bore 82 having a diameter substantially exceeding that of sphere 32. The lower end of bore 82 is closed by a cylindrical dielectric plug 83 which plug is provided with an axial passage 84 in which a conducting rod 86 is disposed. The upper end of rod 86 terminates a slight distance below the upper surface of plug 83 forming, in conjunction with the upper end of passage 84, a depression 87 in which the conducting sphere 32 rests.

For the purpose of propelling sphere 32 upward at a desired instant, a small solenoidal coil 88 is disposed coaxially within the upper portion of bore 82, the coil having an internal diameter exceeding the diameter of the sphere and being positioned a small distance above the rest position of the sphere. Thus a pulse of electrical current through coil 88 will, assuming the sphere to be formed of ferromagnetic material, propel the sphere upward, the distance the sphere travels being determined by the amplitude and duration of the pulse.

Considering now provision for supplying pulses to coil 88, as well as means for providing electrical charge to the sphere 32, there are shown three contacts 89, 91, and 92, transpierced through top plate 81. The first such contact 89 connects, by means of lead wire 93, with rod 86 in the photocathode plate 79. The second contact 91 and third contact 92 connect by means of lead wires 94 and 96 respectively with the terminals of coil 88.

Inasmuch as no fixed connection may be made between the tube model 78 and the stationary components of the apparatus, the head member 34, in this embodiment, is provided with three additional pressure contact assemblies 98, 99, and 101, the head member being otherwise similar to the corresponding element as described in connection with the previous embodiment. Each contact assembly comprises a vertical bore 102 in the underside of cylinder 39, such bores being situated in positions corresponding to those of contacts 89, 91, and 92 on top plate 81. The lower portion of each bore 102 is internally threaded and an externally threaded annular stop 103 is engaged therein. A contact rod 104 is disposed axially within each bore 102, each such rod being transpierced through the central aperture of annular stop 103 and being slideable therethrough. To hold the rods 104 in the bores 102, each rod has a flange 106 at the upper end which flange contacts stop 103 as the rod descends to the lowermost position. To urge the rods 104 downward against contacts 89, 91, and 92, on top plate 16, a compression spring 107 is disposed in the upper portion of each bore 102.

Means for energizing the components of the tube model 78 include a potentiometer 108 connected across the terminals of a voltage source 109, the positive side of the source being grounded. A tap 111 on potentiometer 108 connects with rod 104 in contact assembly 98 thus supplying charge to the sphere 32 through the connections previously described. For the purpose of supplying current pulses to coil 88, to propel the sphere 32 upward, a variable current source 112 is provided, the source being of the class delivering pulses of preselected amplitude, and being provided with a manually operable switch 113 for initiating the production of a pulse. The output of source 112 is delivered to the coil 88 through two leads 114 and 116 connecting with contact assemblies 99 and 101 respectively.

It will be observed that the release of the tube model 78 from head member 34 must be accurately coordinated with the upward motion of sphere 32. To accomplish this, the pulse from source 112 is utilized to trigger circuitry for releasing the model, provision being made for delaying the release for a selected interval after the sphere 32 has begun its upward motion. Thus, as in the previously described embodiment, the tube model 78 is retained at head member 34 by an electromagnet 42 contained within the head member. The electromagnet connects with a magnet current power supply 56 through an electronic switch 117 which switch is normally closed and which opens momentarily upon receipt of a trigger pulse.

To coordinate the opening of switch 117 with the upward motion of sphere 32, the input of a univibrator 118 is connected to the output of current source 112, the univibrator being adjustable to produce an output pulse having a pre-selected duration. The pulse from univibrator 118 is delivered to a differentiator 119 which produces a positive output pulse corresponding to the leading edge of the pulse from the univibrator followed by a negative pulse corresponding to the trailing edge of the univibrator pulse. The time separation of the two pulses from the differentiator is thus determined by the duration of the univibrator pulse and may be controlled by appropriate adjustment of the univibrator. The output pulses from the differentiator 119 are delivered to the control input of electronic switch 117. Since the first of the two output pulses produced by differentiator 119 is positive, it does not affect the switch 117. The second pulse, however, is negative and therefore opens the switch 117, deactivating electromagnet 42 and causing the tube model 78 to drop from the head member 34. Thus, by suitable adjustment of the univibrator 118, the time delay between the start of upward motion of sphere 32 and the release of the model 78 from the head member 34 may be accurately controlled.

It will be understod that the electrodes for establishing an electric field with tube model 78, as well as means for charging such electrodes, are similar to those described in connection with the first embodiment and are therefore not duplicated in Figure 3.

The foregoing embodiment is employed in a manner generally similar to the procedure described in connection with the first embodiment. With the sphere disposed in bore 82, in contact with rod 86, the tube model 78 is suspended from head member 34. While the model 78 remains suspended, the sphere is charged, through contact assembly 98 and the associated leads, to a value determined by the setting of tap 11 of potentiometer 108. Such setting is determined, in volts, by the relationship:

$$V = \frac{q}{C}$$

where $q$ equals the charge to be placed on the sphere 32, and C equals the capacitance between the sphere 32 and the adjacent wall of bore 82.

The relationship fixing the charge to be applied to the electrodes within tube model 78 differs from that given for the first embodiment of the invention and is as follows:

$$a = \frac{3}{4} \frac{q}{\pi \rho} \frac{E_n}{r^3}$$

where: $a$, $\rho$, $E_n$, and $r$ represent the quantities defined with respect to the previous equation and $q$ is the charge placed upon the sphere.

The latter relationship is obtained by expressing the force on the sphere 32 as the product of the charge and the field: $F = q(E_n)$ and substituting the same in Newton's Second Law of Motion as before. Thus:

$$a = \frac{F}{M} = \frac{qE_n}{4/3 \pi r^3 \rho}$$

which reduces to the above relationship.

In the case where the sphere 32 is to simulate an electron released at the surface of a photocathode without an appreciable initial velocity, the sphere must be propelled with a force just sufficient to bring it to the surface of plate 79 and the model 78 must be released at the instant the sphere reaches this position. Regulating of the distance the sphere 32 is propelled upward is accomplished by regulating the amplitude of the pulse supplied coil 88 by supply 112. To effect the release of the model 78 at the desired instant, univibrator 118 must be set to deliver a pulse having a time duration equal to the time required for the sphere to travel upward to the surface of plate 79 less the time delay, if any, produced by the effects of residual magnetism in electromagnet core 42. The requisite time delay is dependent upon a number of factors particular to each embodiment of the invention and is therefore best determined empirically by trial adjustment of the univibrator.

In those instances where the sphere 32 is to simulate a condition in which an electron is emitted from a photocathode surface with a particular initial velocity, source 112 is adjusted to propel the sphere upward with an analogous velocity. Univibrator 118 is adjusted to release the tube model 78 at the instant the sphere passes the upper surface of the photocathode plate 79.

It will be understood that while this embodiment has been described as utilizing a single sphere, any number of such spheres may be employed for the purpose of determining the motion of electrons from a variety of positions on photocathode plate 79. Similarly, while the apparatus herein disclosed eliminates gravitational influence on the spheres by allowing the tube model to fall freely, other means are suitable for this purpose. It is contemplated, for example, that the tube model may be advantageously mounted on a vertical belt which belt is maintained between pulleys driven by synchronous motors. By suitable control of the synchronous motors, the tube model may be caused to descend at a rate equivalent to a free fall and may be readily stopped and returned to the starting position.

Thus it will be apparent to those skilled in the art that numerous variations and modifications may be made within the spirit and scope of the invention and it is not intended to limit the invention except as defined in the following claims.

What is claimed is:

1. In analog apparatus for determining the motion of charged particles in an electric field, the combination comprising a charged electrode structure simulating said electric field, at least one small conducting element disposed within said electrode structure and simulating a charged particle therein, means dropping said electrode structure at a free fall rate whereby said conducting element is rendered effectively weightless and is electrostatically accelerated within said charged electrode structure analogously with the motion of said charged particle within said electric field, and means displaying the instantaneous position of said conducting element within said electrode structure at least one instant during the downward motion thereof.

2. Analog apparatus for studying the motion of electrically charged particles through an electrical field comprising, in combination, a vessel containing a plurality of spaced apart charged electrodes simulating said electrical field, at least one electrically conductive sphere disposed within said vessel and simulating a charged particle therein, means producing a downward acceleration of said vessel substantially at free fall rate, and means displaying the motion of said conductive sphere through said vessel as said vessel drops.

3. In analog apparatus for studying the motion of electrically charged particles through an electric field substantially as described in claim 2 and comprising the further combination of means associated with said vessel for imparting an electrical charge to said sphere which charge is independent of the charge on said electrodes.

4. In analog apparatus for studying the motion of electrically charged particles through an electrical field substantially as described in claim 2, the further combination of means for propelling said conductive sphere in selected direction within said vessel substantially at the commencement of the downward acceleration thereof.

5. An analog device for computing the motion of electrically charged particles between electrically charged bodies comprising, in combination, a vessel at least a portion of the wall of which is transparent, a plurality of electrodes disposed within said vessel, said electrodes being shaped analogously with said electrically charged bodies, means charging said electrodes to potentials proportional to those of said electrically charged bodies, an electrically conductive sphere disposed within said vessel and simulating an electrically charged particle therein, means dropping said vessel at gravitational acceleration, and means indicating the instantaneous position of said sphere with respect to said electrodes at a selected instant during the downward motion of said vessel.

6. In analog apparatus for studying the motion of charged particles through an electric field, the combination comprising a stationary support, a vessel releasably suspended from said support, at least a portion of the wall of said vessel being transparent whereby the interior thereof may be viewed, a plurality of spaced apart charged electrodes disposed within said vessel and simulating said electric field, at least one electrically conductive sphere initially resting within said vessel at a point from which particle motion is to be traced, and means positioned downwardly from said stationary support for observing the instantaneous position of said sphere within vessel at a selected time following the release of said vessel from said support.

7. Analog apparatus for determining the motion of charged particles through a system of charged electrodes comprising a model structure having conductive members formed as scale models of said charged electrodes, at least one conducting sphere disposed in said model structure at a point therein from which charged particle motion is to be traced, a stationary support disposed in an elevated position, said support having provision for releasably suspending said model structure, a voltage source connecting with said conductive members within said model structure through said stationary support for charging said members to voltages proportional to those of said charged electrodes, and photographic means disposed downwardly from said support for recording the position of said sphere within said model structure at a selected instant following release of said model structure from said stationary support.

8. Analog apparatus substantially as described in claim 7 wherein a ferromagnetic element is secured to said model structure, and said provision for releasably suspending said model structure from said stationary support comprises an electromagnet secured to said support and holding said model structure by attraction of said ferromagnetic element thereof, a power supply energizing said electromagnet, and control switch means for interrupting connection between said power supply and said electromagnet whereby said model structure is released from said support.

9. In an analog apparatus for plotting the motion of charged particles through an electric field, the combination comprising a vessel having a transparent wall, a plurality of spaced apart electrodes disposed within said vessel, said electrodes being shaped to generate an electric field analogous to the electric field which is to be studied, at least one conducting sphere disposed within said vessel to simulate a charged particle therein, a stationary support disposed in an elevated position, said support having provision for releasably suspending said vessel, a source of electric potential supplying charge to said electrodes within said vessel by connections through said stationary support, cushioning means positioned a substantial distance beneath said support for receiving said vessel following release thereof from said support, a camera disposed between said support and said cushioning means, said camera being focussed on a region traversed by said vessel as said vessel drops from said support to said cushioning means, and control means actuating said camera as said vessel passes across the optical axis thereof whereby said camera records the instantaneous position of said sphere within said vessel.

10. An analog apparatus for computing the motion of charged particles through an electrical field comprising, in combination, a model structure having electrodes shaped and changed to create an analog of said electrical field, at least one insulating receptacle disposed within said model structure, a conducting sphere disposable within each said receptacle, potential source means connecting with each said receptacle for charging said sphere therein to a selected potential, proportional to the charge of said charged particles, means dropping said model structure at free fall acceleration, and means displaying the instantaneous position of said sphere within said model structure at a selected time during the downward motion thereof.

11. An analog means for determining the motion of charged particles through an electric field comprising, in combination, a vessel having a transparent wall, a plurality of electrodes disposed within said vessel and shaped to simulate said electric field, an insulated receptacle within said vessel, said receptacle having a chamber opening into the region between said electrodes, a conductive magnetic sphere disposable within said receptacle, a solenoidal coil disposed coaxially with respect to said chamber in said receptacle, a potential source connected to charge said electrodes, a pulsed current source connected with said solenoidal coil and adapted to selectively apply a pulse thereto whereby said sphere is impelled from said receptacle into the region between said electrodes, means dropping said vessel with a downward acceleration equivalent to that of gravity, and means recording the position of said sphere with respect to said electrodes at a selected instant during the downward motion of said vessel.

12. Apparatus for tracing the motion of charged particles through an electrical field comprising, in combination, a stationary support, an electromagnet secured thereto, a current source connected to energize said electromagnet, switch means connected between said current source and said electromagnet for de-energizing said electromagnet, a vessel having a transparent lateral wall and having a ferromagnetic element at the upper end whereby said vessel may be suspended from said support by attraction of said ferromagnetic element to said electromagnet, a plurality of electrodes disposed within said vessel, said electrodes being shaped to establish an analog of the electrical field which is to be studied, an insulating element disposed within said vessel and having a receptacle which receptacle opens into the region between said electrodes, a conducting magnetic sphere disposed within said vessel, said sphere being positionable in said receptacle of said insulating element, a solenoidal coil disposed within said vessel in proximity to said insulating element, a source of electrical potential connecting with said electrodes, in said vessel through said stationary support and connecting with said sphere through said stationary support and said insulating element, said source of potential being adapted to supply selected potentials to each of said electrodes and to said sphere whereby said electrical field and said charged particle is simulated within said vessel, a pulsed current source connecting with said solenoidal coil within said vessel through said stationary support, said pulsed current source and said coil acting to impel said sphere into the region between said electrodes, means selectively timing the opening of said switch means with respect to the delivery of a current pulse to said solenoidal coil whereby said vessel is released from said support at a selected time during the motion of said sphere, and a camera disposed downwardly from said support and adapted to photograph said vessel as said vessel falls from said support whereby the instantaneous position of said sphere within said vessel is indicative of the motion of said charged particle within said electrical field.

References Cited in the file of this patent
UNITED STATES PATENTS

| | | |
|---|---|---|
| 2,178,238 | Massa et al. | Oct. 31, 1939 |
| 2,567,647 | Loeb | Sept. 11, 1951 |

OTHER REFERENCES

Periodical: Radio News, January 1948 issue, page 21, article on "Simulated Electronic Tubes."

Periodical: Proceedings of the I.R.E., May 1950, pgs. 521–524 (incl.), article on "A Dynamic Electron Trajectory Tracer."

Periodical: British Journal of Applied Physics, vol. 5, May 1954, pages 191–195, article on "Automatic Electron Trajectory Plotting."